(12) United States Patent
Vincent

(10) Patent No.: US 10,921,824 B2
(45) Date of Patent: Feb. 16, 2021

(54) ATTITUDE FINE TRACKING SYSTEM FOR MANUAL AIRCRAFT CONTROL

(71) Applicant: Embraer S.A., São José dos Campos-SP (BR)

(72) Inventor: Kevin Graeme Vincent, São José dos Campos (BR)

(73) Assignee: EMBRAER S.A., São José dos Campos-Sp (BR)

( * ) Notice: Subject to any disclaimer, the term of this patent is extended or adjusted under 35 U.S.C. 154(b) by 319 days.

(21) Appl. No.: 15/692,140

(22) Filed: Aug. 31, 2017

(65) Prior Publication Data

US 2019/0064850 A1    Feb. 28, 2019

(51) Int. Cl.
| | |
|---|---|
| *G05D 1/08* | (2006.01) |
| *B64C 13/50* | (2006.01) |
| *B64D 39/00* | (2006.01) |
| *B64C 13/16* | (2006.01) |
| *B64C 13/04* | (2006.01) |
| *G05D 1/10* | (2006.01) |

(52) U.S. Cl.
CPC .......... *G05D 1/0816* (2013.01); *B64C 13/04* (2013.01); *B64C 13/16* (2013.01); *B64C 13/503* (2013.01); *B64D 39/00* (2013.01); *G05D 1/0808* (2013.01); *G05D 1/104* (2013.01)

(58) Field of Classification Search
CPC .... G05D 1/0816; G05D 1/0808; G05D 1/104; B64D 39/00; B64C 13/04; B64C 13/16; B64C 13/503
See application file for complete search history.

(56) References Cited

U.S. PATENT DOCUMENTS

| | | | | |
|---|---|---|---|---|
| 5,446,666 A | * | 8/1995 | Bauer | B64C 13/503 701/4 |
| 6,161,062 A | * | 12/2000 | Sicre | G01S 3/48 340/974 |
| 2009/0062973 A1 | * | 3/2009 | Caldeira | G05D 1/0833 701/6 |
| 2011/0168851 A1 | * | 7/2011 | Cherepinsky | G05D 1/0858 244/223 |
| 2018/0016026 A1 | * | 1/2018 | Carlson | B64D 39/06 |

\* cited by examiner

*Primary Examiner* — Geepy Pe
*Assistant Examiner* — Bakari Underwood
(74) *Attorney, Agent, or Firm* — Nixon & Vanderhye PC

(57) ABSTRACT

To improve high gain tracking characteristics of an aircraft during inflight probe and drogue refueling and other tasks requiring rapid trim capturing, an attitude hold button on the inceptor controls capture of current aircraft attitude and uses this attitude to update reference attitude datum. The pilot has the option of adjusting the attitude reference using an additional control such as a standard trim hat button.

20 Claims, 17 Drawing Sheets

Fine Tracking Quickener

Sidestep Maneuver (Straight Flight)

Sidestep Maneuver with RCAH system

Sidestep Maneuver with ACAH system

Attitude Command Attitude Hold System

Comparison of the characteristics of a RCAH and ACAH system in response to a dimensionless pitch input.

Command Shaping

Fine Tracking Quickener

Attitude Reference Calculation and Logic

ATTITUDE FINE TRACKING SYSTEM FOR MANUAL AIRCRAFT CONTROL

CROSS-REFERENCE TO RELATED APPLICATIONS

None.

STATEMENT REGARDING FEDERALLY SPONSORED RESEARCH OR DEVELOPMENT

None.

FIELD

This technology relates to aircraft flight control systems, and specifically to providing enhanced Fine Tracking capability for manually controlled large aircraft systems.

BACKGROUND & SUMMARY

In-flight refueling is an important capability for many military aircraft, making it possible to perform missions that would otherwise not be feasible. There are two in-flight refueling systems commonly used by today's air-forces: The Flying Boom System and the Probe and Drogue System.

The Flying boom is a rigid, telescoping tube that an operator on the tanker aircraft extends and inserts into a receptacle on the aircraft being refueled. The hose and drogue refueling method employs a flexible hose that is unspooled and trails from the tanker aircraft. A drogue (a small windsock usually referred to as the re-fueling "basket") at the end of the fuel hose stabilizes the hose end in flight—see FIG. 1-1. The basket provides a funnel for the aircraft being refueled, which inserts a probe into the drogue to seal with the hose (see FIG. 1-2). Once a sealed connection is established between the receiving aircraft's probe and the tanker's drogue (see FIG. 1-3), the tanker can begin pumping fuel through the hose to the aircraft being refueled (see FIG. 1-4). When sufficient fuel has been transferred, the aircraft being refueled disconnects its probe from the tanker's drogue and maneuvers away from the tanker to continue its mission.

Both systems have advantages and disadvantages. One advantage the Flying Boom System has over the Probe and Drogue system is that the final stage of the connection is performed by a dedicated Boom controller, who is able to "fly" the rigid Boom into the receptacle of the receiver aircraft. The pilot of the aircraft being refueled simply needs to maintain close formation astern of the tanker during the period of refueling. The probe and drogue system in contrast requires the pilot of the receiving aircraft to fly with extreme precision in order to make the connection with the trailing drogue. It is easier to perform this maneuver with an agile fighter type receiver aircraft than with a large transport type receiver aircraft. This is one of the reasons why most large military aircraft which are required to be refueled in flight are equipped with a system which operates in conjunction with a Flying Boom. The probe and drogue system however is a much simpler and less costly system which enables the airframe to be re configured as and when needed, as is typical for a modern multi role military aircraft.

When performing the Air-to-Air re-fueling task, it can be assumed that the tanker aircraft will be tracking a constant predefined trajectory at constant velocity. When re-fueling using the conventional Probe and Drogue system, the pilot of the receiver aircraft is responsible for the approach and tracking of the trailing tanker drogue. This accurate high gain tracking task requires extremely precise control in elevation and azimuth. To successfully track the basket, the pilot must control the receiver aircraft onto exactly the same heading as that of the tanker, directly astern of the basket. Ideally, he should make contact with the basket within a radius of error of about 20 cm. Once contact has been made, he must then keep station within +−2 m radially from the initial contact point and 5 meters along track relative to the tanker. To achieve this degree of accuracy, the pilot must track bank angle relative to the tanker and consistently and accurately fly the aircraft at a pitch attitude to match the height rate of the tanker. A small mismatch of bank angle from that required will result in a lateral drift seen as a heading rate error, and a small error in pitch attitude will result in a vertical height rate error.

During the fine tracking phase, whenever the pilot performs a "side step" maneuver to make a lateral correction, the pilot is required to return to the reference bank angle and pitch attitude that existed at the start of the maneuver (by definition the sidestep maneuver is performed to always finish on the same heading as at the start of the maneuver). FIG. 1a shows the process involved to perform a side step maneuver when tracking and FIGS. 1b and 1c illustrate exemplary pilot inputs required to perform the maneuver using a Rate Command Attitude Hold (RCAH) system or an Attitude Control Attitude Hold (ACAH) system, respectively.

FIG. 1a shows a typical example Sidestep maneuver that is often required during a fine tracking task. Note that at points 1, 3 and 5, the pilot controls the aircraft to have a wings level attitude. The pilot attempts to make the maneuver as close to symmetric as possible as this helps when judging the time and magnitude during stages 2 (left bank) and 4 (right bank).

FIG. 1b shows the pilot inputs (simplified form) that are required to perform the FIG. 1a sidestep maneuver when the system is configured with a Rate Command Attitude Hold ("RCAH") type controller. The top line shows inceptor lateral displacement required for the maneuver using this type of controller. The stick begins with no left-right displacement. The pilot moves the stick to the left, then back to center, then to the right, then back to center, then to the right again, then back to center, then to the left, and back to center. As the inceptor behaves in this context as a turn acceleration controller, it is difficult to judge the time and size of each inceptor movement required to perform the sidestep maneuver with any degree of accuracy.

FIG. 1c shows the pilot inputs (simplified form) that are required to perform the FIG. 1a sidestep maneuver when the system is configured with an Attitude Command Attitude Hold ("ACAH") type controller. The lower graph shows the inceptor left-right displacement, with the pilot moving the stick to the left for a left bank and to the right for a right bank. As the inceptor behaves as a turn rate controller in this context, the number of basic movements required for this type of system is halved as compared to the RCAH arrangement. The time taken to return to the bank datum (in this case zero bank) is more consistent hence making it easier to judge the time and size of each inceptor movement necessary to perform the maneuver. It is well known to invoke such response in a fly-by-wire system to perform a specific task such as inflight refueling. See e.g., Taschner, Michael J., "A Handling Qualities Investigation of Conventional, Rate Command/Attitude Hold, and Attitude Command/Attitude Hold Response-Types in the Probe and Drogue Air Refueling Task", Air Force Institute of Technology, Wright-Patterson Air Force Base, Ohio School of Engineering (March 1994), incorporated herein by reference.

While work has been done in the past, further improvements and innovations are possible and desirable.

BRIEF DESCRIPTION OF THE DRAWINGS

The following detailed description of exemplary non-limiting illustrative embodiments is to be read in conjunction with the drawings of which:

FIG. 2 shows an example fly by wire control system including example non-limiting changes to convert the standard Rate command Attitude Hold system to an Attitude command Attitude Hold system specifically designed to be used for Air to Air Refueling Receiver (AARR) missions and other tasks.

FIG. 3 illustrates the different response characteristics of a RCAH and ACAH system for a dimensionless pitch input to each system.

FIGS. 3a, 3b-1, 3b-2, 3c-1, 3c-2, 3d-1, 3d-2, 3e-1 and 3e-2 show more detailed example graphs of the FIG. 3 signals.

FIG. 4 shows an image of an example Side-stick showing location of Trim Hat Button and Attitude Hold (TCS) button.

DETAILED DESCRIPTION OF EXAMPLE NON-LIMITING EMBODIMENTS

As discussed above, it is common for smaller, more nimble aircraft to refuel in the air using the Probe and Drogue system but less common for larger, relatively less maneuverable aircraft to attempt it. However, given the advantages of probe and drogue in-flight refueling, a worthwhile objective is to provide a more general solution so that for example a fly-by-wire ("FBW") equipped, Class III heavy aircraft also has the ability to fly with a level of precision required for fine tracking of the drogue during the Probe and Drogue refueling task.

Dedicated Attitude Hold Button

One aspect of the example non-limiting embodiments herein provides a key part to enable the specified fly by wire control laws to improve the high gain tracking characteristics of the aircraft.

Figures 1, 2, 3:
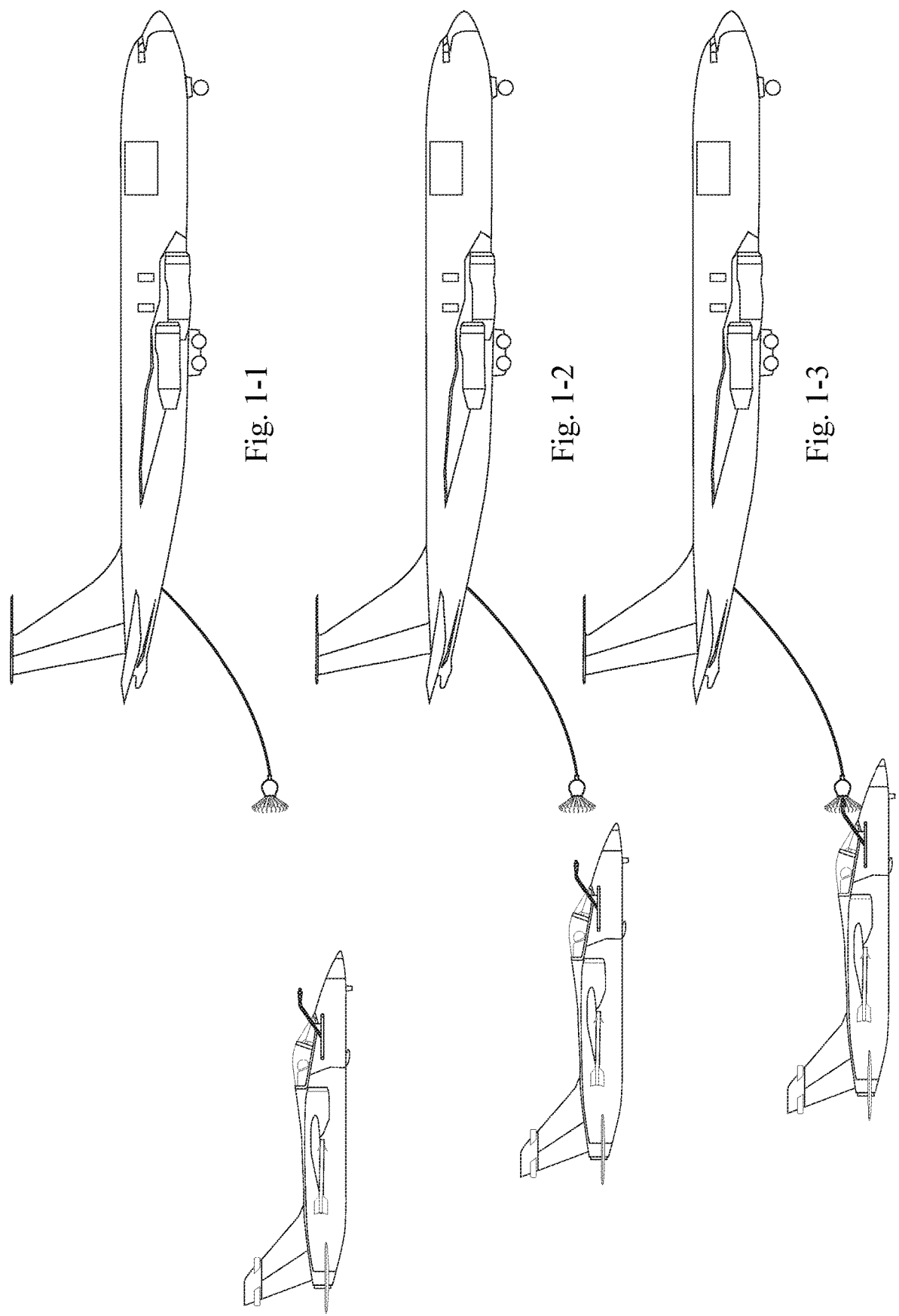
FIGS. 1-1, 1-2, 1-3 and 1-4 show example illustrative diagrams of an aircraft refueling in the air using a "probe and drogue" refueling system.
Figures 1, 2, 3, 4:
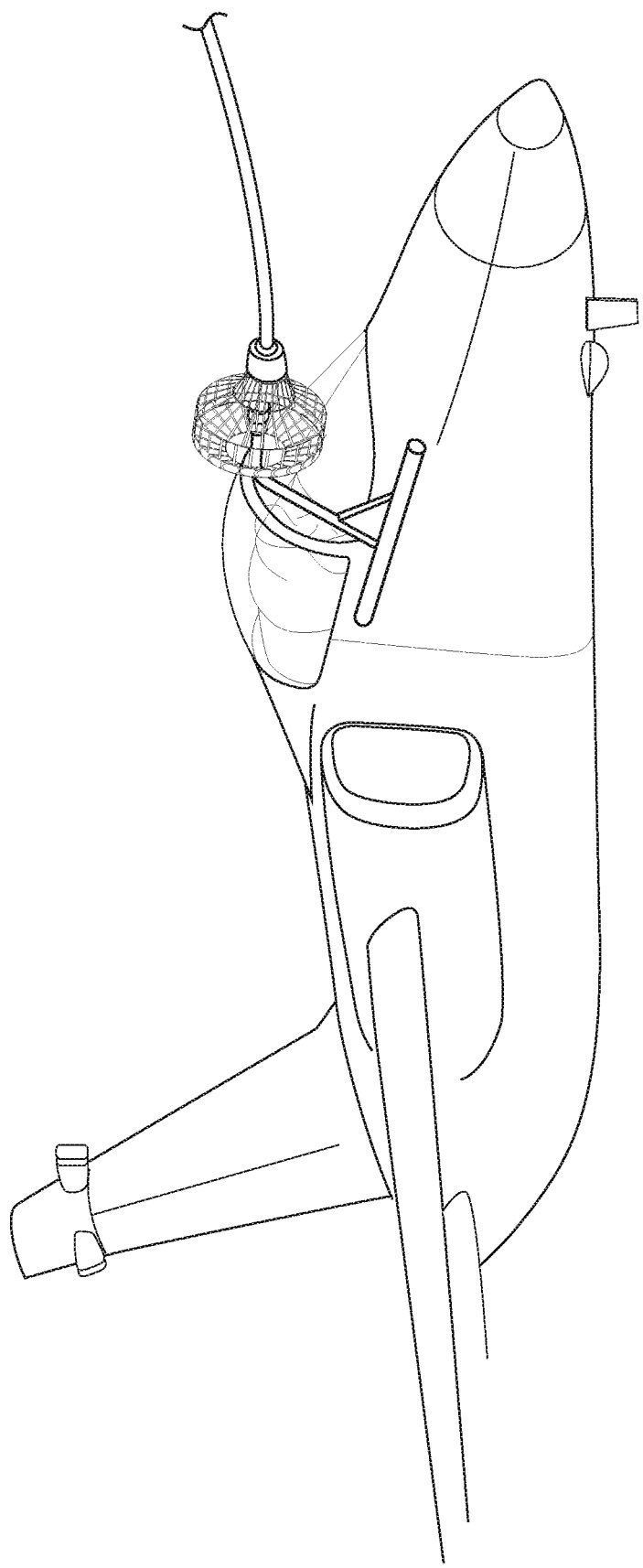
Figure 1A:
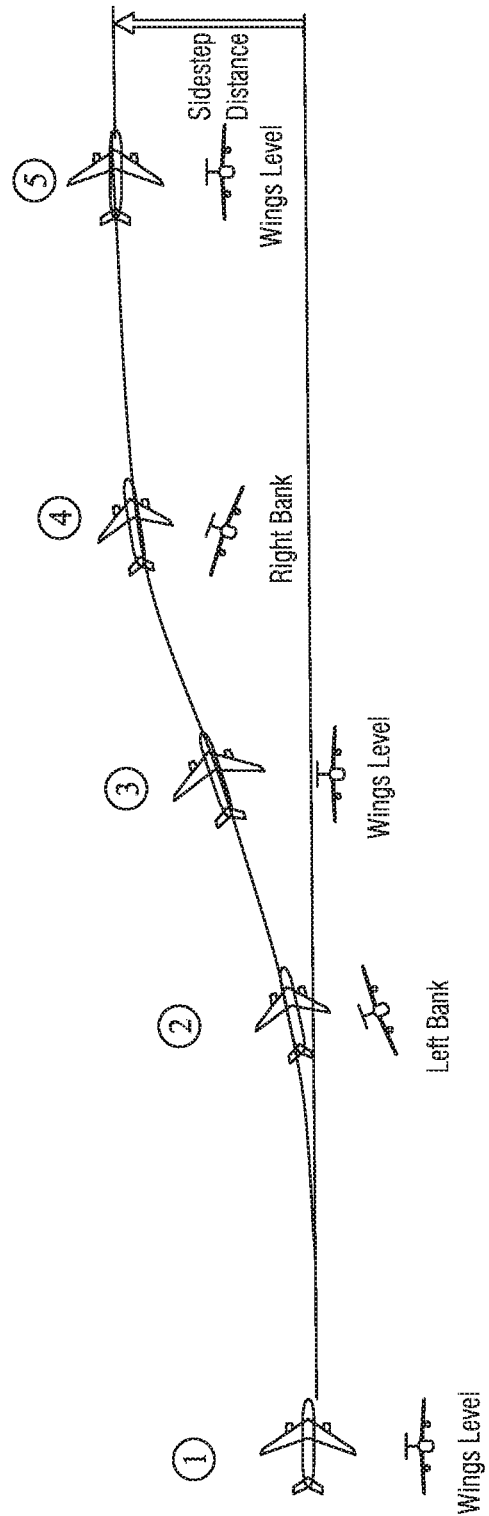
FIG. 1a shows a typical Sidestep maneuver that would be required during a fine tracking task.
Figure 1B:
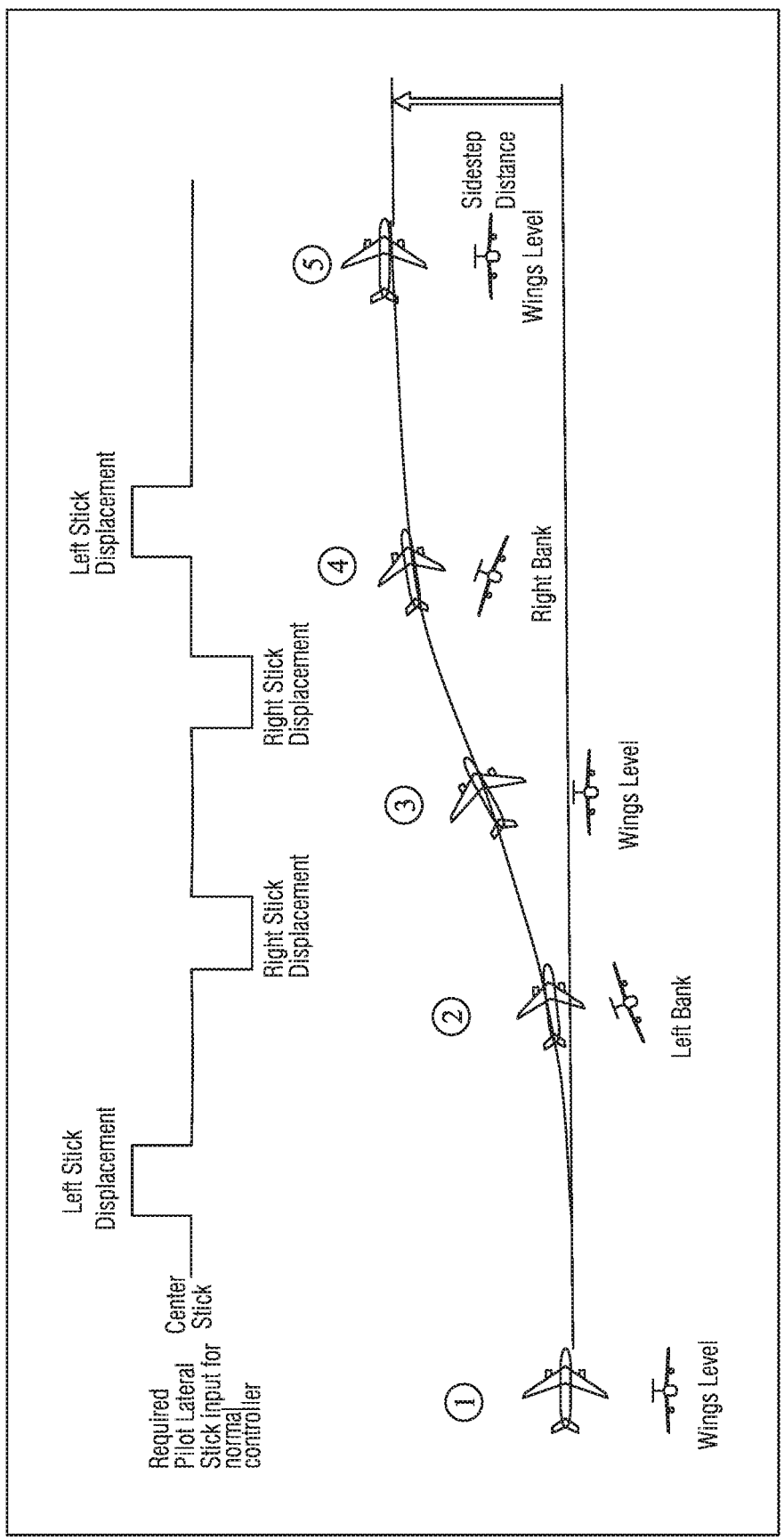
FIG. 1b shows the pilot inputs (simplified form) that are required to perform the sidestep maneuver when the system is configured with a RCAH type controller.
Figure 1C:
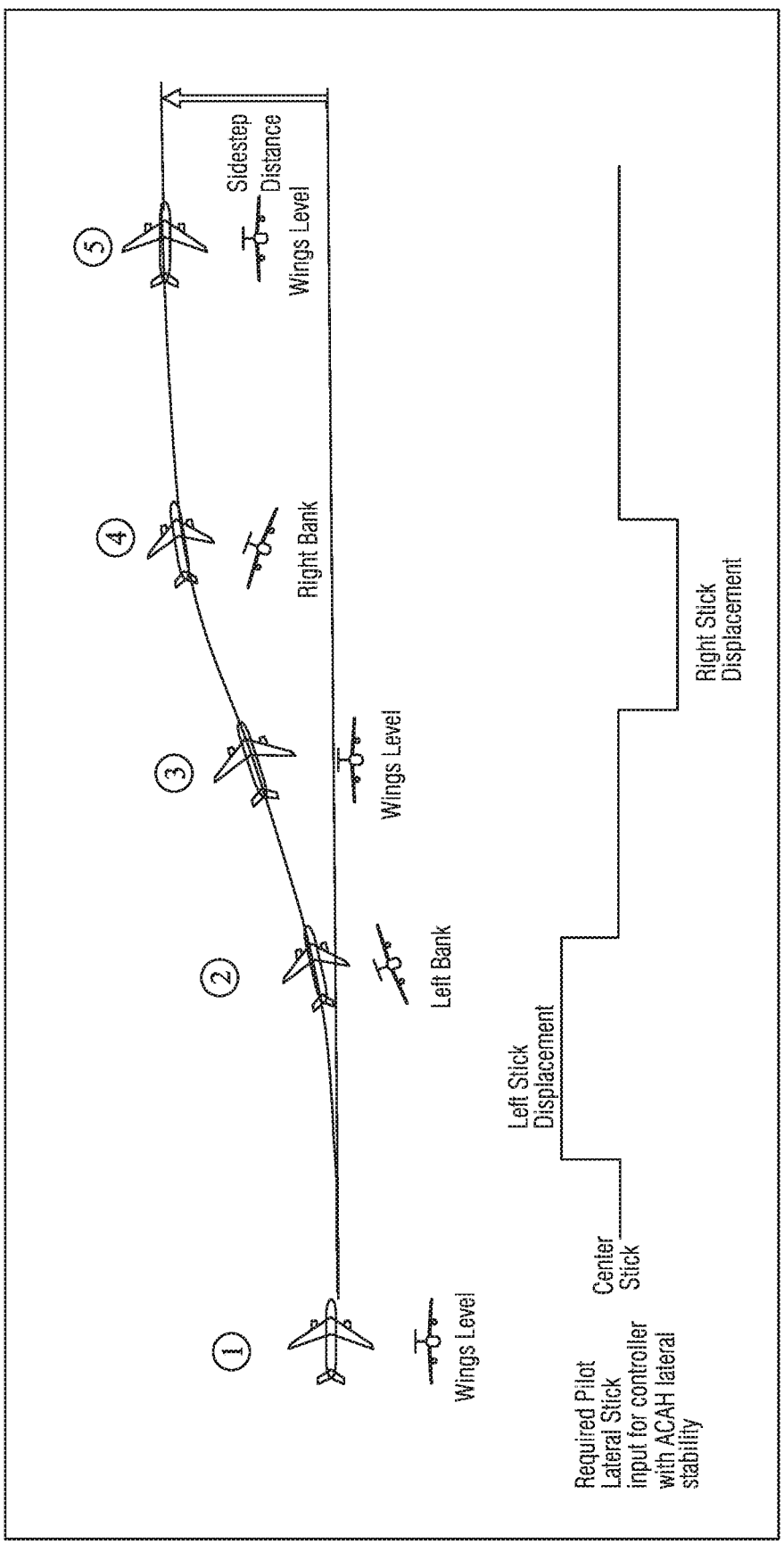
FIG. 1c shows the pilot inputs (simplified form) that are required to perform the sidestep maneuver when the system is configured with an ACAH type controller.
Figure 2:
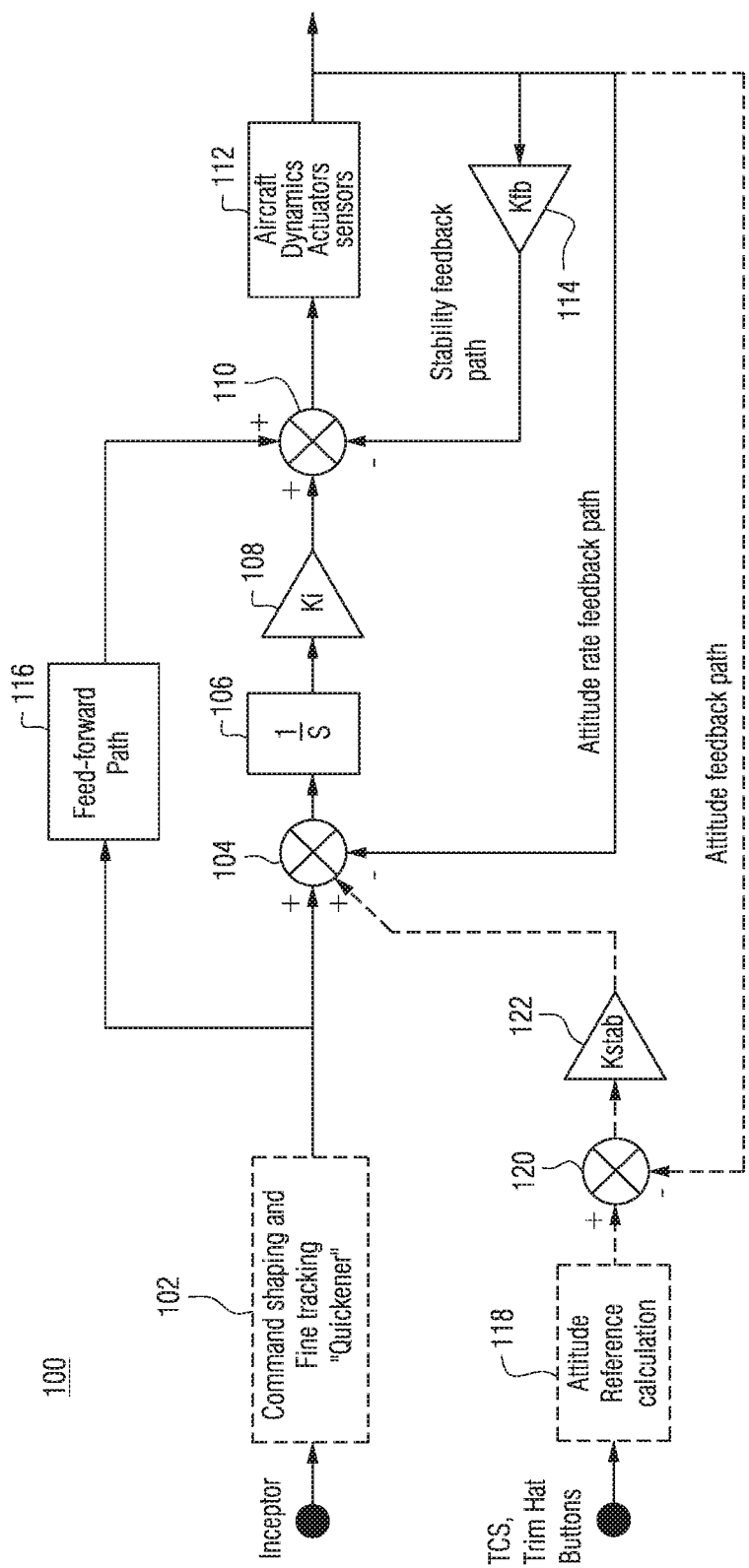

In particular, the technology herein makes use of a dedicated "Attitude Hold Button" on the stick grip. FIG. 4 shows such an arrangement. Specifically, FIG. 4 shows an example side-stick 200 showing location of Trim Hat Button 204 and a bank Attitude Hold (TCS) button 206.

On pressing and releasing this Attitude Hold Button (TCS) 206, the control system captures the current aircraft attitude at the moment of button release and uses this attitude to update the reference Bank and Pitch datum to be used by the control system.

Using this example non-limiting technology, the pilot is able to simultaneously capture both Bank and Pitch attitudes by pressing and releasing button 206. However, in other example embodiments, button 206 could be used to update only one of the two reference attitudes (i.e., bank attitude or pitch attitude only).

The term "dedicated" in this context does not mean that TCS button 206 is limited to performing only the above task and no other tasks. Rather, TCS button 206 can perform other tasks in other modes of flight operation. When the inflight refueling task is invoked, the flight computer can (re)assign the TCS button 206 to capture attitude of the aircraft as discussed above. Thus, in such a non-limiting embodiment, the TCS button 206 function is dedicated to capturing attitude as described above when the aircraft is operating in this particular mode.

While the preferred embodiment captures the attitude when button 206 is released, in other embodiments the attitude can be captured when the button is depressed, released then depressed again, released then depressed and released again, or other variations as will be understood by those skilled in the art. The term "button activation" is hereby expressly defined to encompass all such variations.

Furthermore, the example non-limiting technology herein is not limited to the inflight refueling task. Rather, it may be used in conjunction with a standard Attitude Command Attitude Hold system whenever rapid accurate trim capturing is required for specific tasks (e.g., Air to Air refueling, Low Altitude Airdrop with and without the use of LAPES, SAR missions, Close formation flying, and other contexts).

Depending on preferences, the pilot has also the option of adjusting the Attitude Reference using the standard trim hat button 204, the location of which is also shown in FIG. 4.

Attitude Command Attitude Hold System

By introducing roll and pitch attitude stability loops to the RCAH system, the aircraft will naturally return to the initial reference bank angle without the pilot having to concentrate on controlling this, and the system is converted to an ACAH system. FIG. 2 illustrates a generic non-limiting example diagram for the two systems indicating the elements and paths required for conversion—and in particular, shows example changes to convert the standard Rate command Attitude Hold system to an Attitude command Attitude Hold system specifically designed to be used for Air to Air Refueling Receiver (AARR) missions. This generic FIG. 2 diagram is equally representative for both lateral and longitudinal control.

The example Fly-By-Wire Control Law mode chosen specifically for the Air-to-Air fine tracking refueling task uses a standard Proportional plus integral rate controller applied to the Longitudinal and Lateral axes, as used for normal flight, but with modifications applied to the stick shaping functions employed in the longitudinal and lateral command paths. There are additional Fine Tracking Quickener paths plus the introduction of additional attitude stability loops. The attitude stability loops proved to be very effective in alleviating pilot workload, so long as the pilot has the capability to quickly adjust the trim references.

In more detail, as can be seen from FIG. 2, the inceptor displacement input is provided to a conventional summer 104 that also receives input from a trim hat and a TCS (touch control steering) button (see FIG. 4). A 1/S inversion block 105 followed by a gain (amplification) block 108 provides a signal to a further summer 110. There is also a feed forward path function that provides the quickened, shaped inceptor command signal to summer 110. Summer 110 generates an output to be applied to aircraft dynamics actuators 112. Sensors (also block 112) meanwhile provide a feedback input to a further gain block 114 providing stability feedback closed loop control via the "-" input to summer 110. A further closed loop attitude rate feedback path to summer 104 provides attitude rate feedback.

Further modifications/additions (e.g., which can be selectively activated by a mode selector on demand when needed to perform the inflight refueling task) include:

a modified Command shaping function 102 for AARR (air to air refueling receiver).

an Attitude feedback path (shown in dotted) to an additional summer 120 and gain block 122 with feedback gain Kstab operating on the Attitude error from a reference signal provided by attitude reference calculation 118 (this additional summer 120 provides its output signal to summer 104).

the attitude reference calculation function 118 calculating the Attitude Reference using inputs either from the reconfigured trim hat Button or the TCS button.

Figure 3:
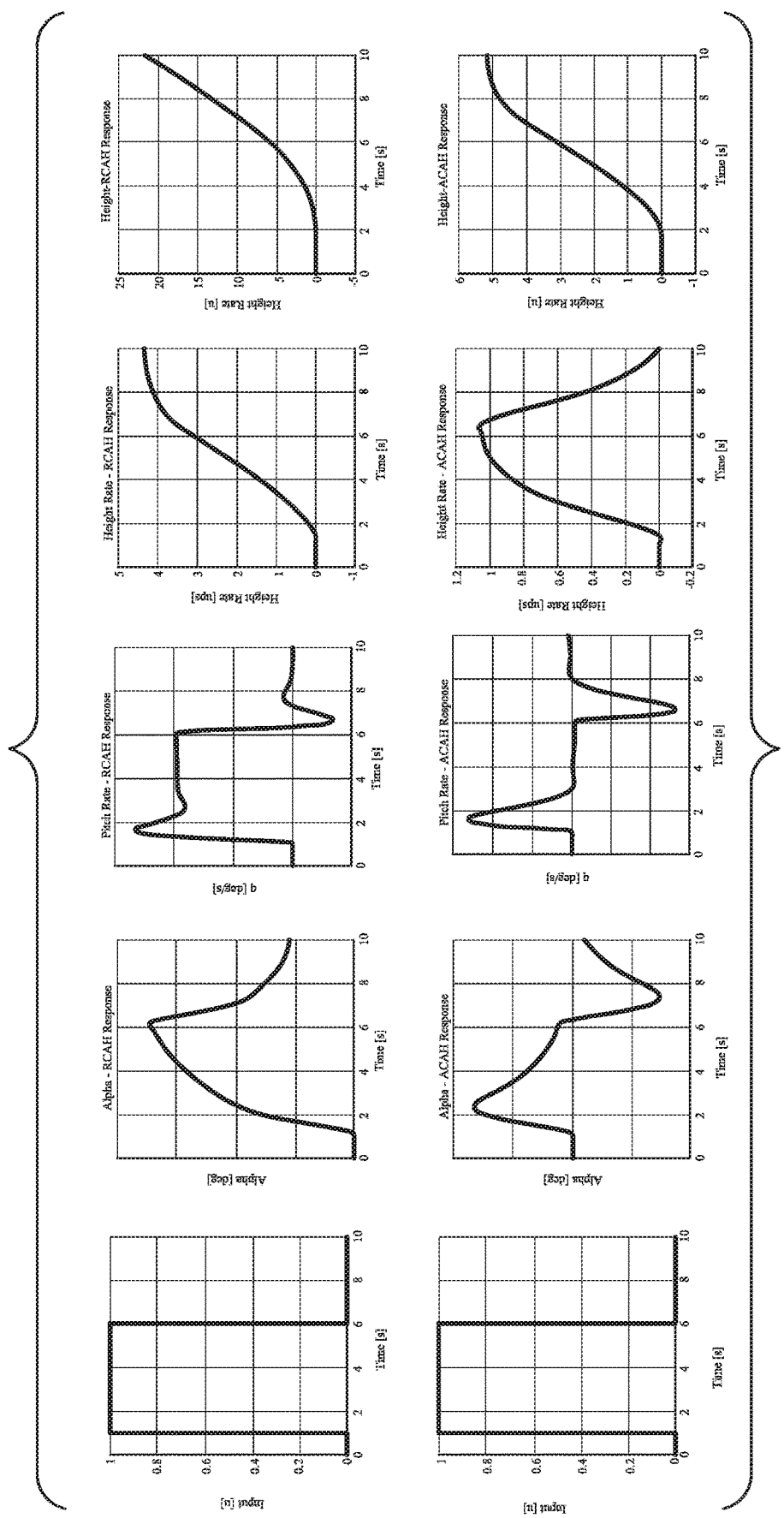
Figure 3A:
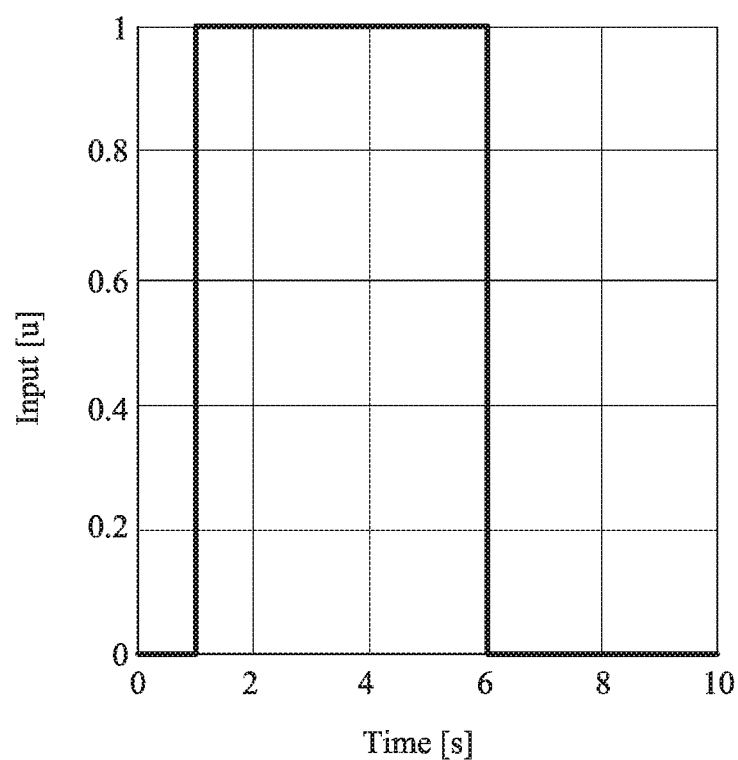
Figures 1, 3B:
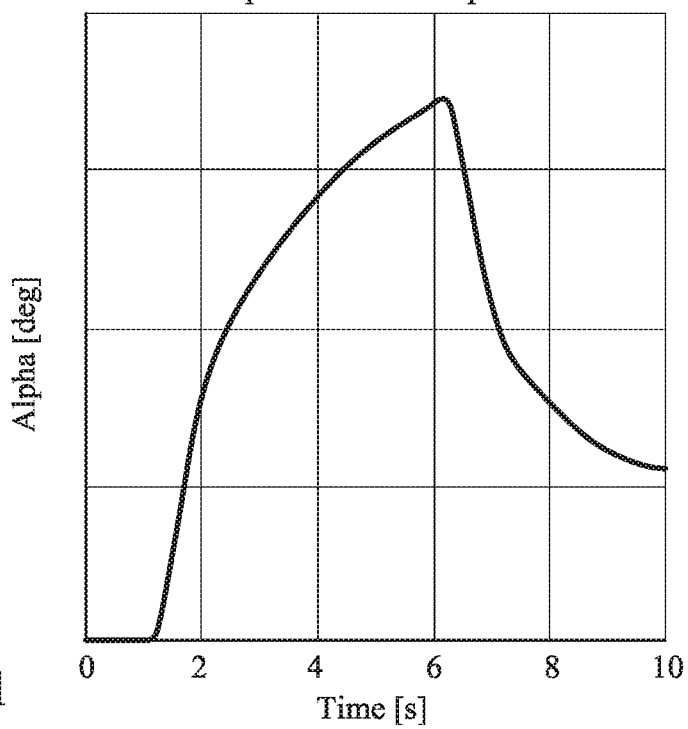
Figures 2, 3B:
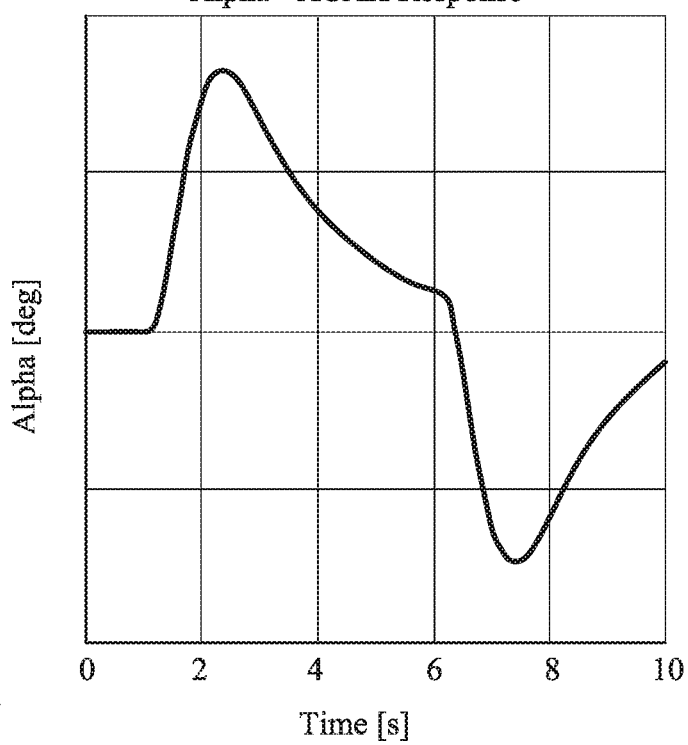
Figures 1, 3C:
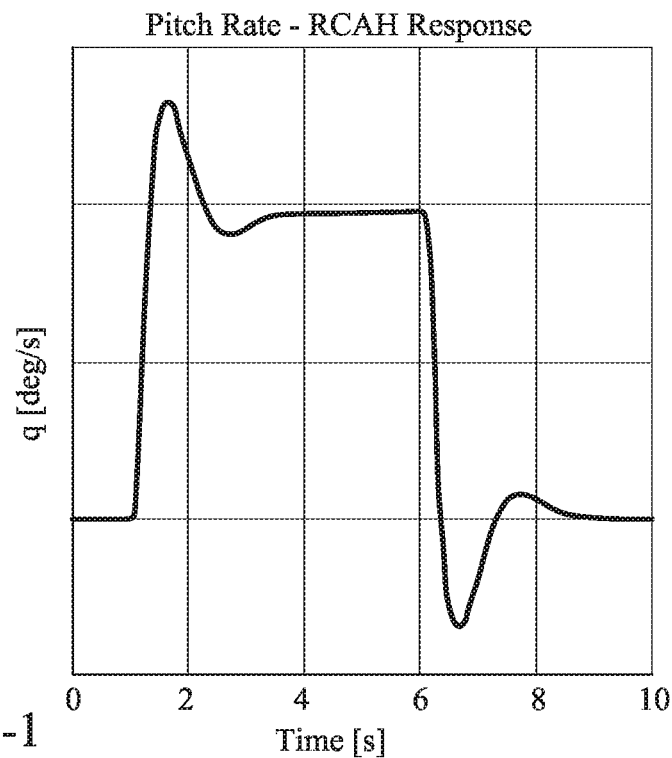
Figures 2, 3C:
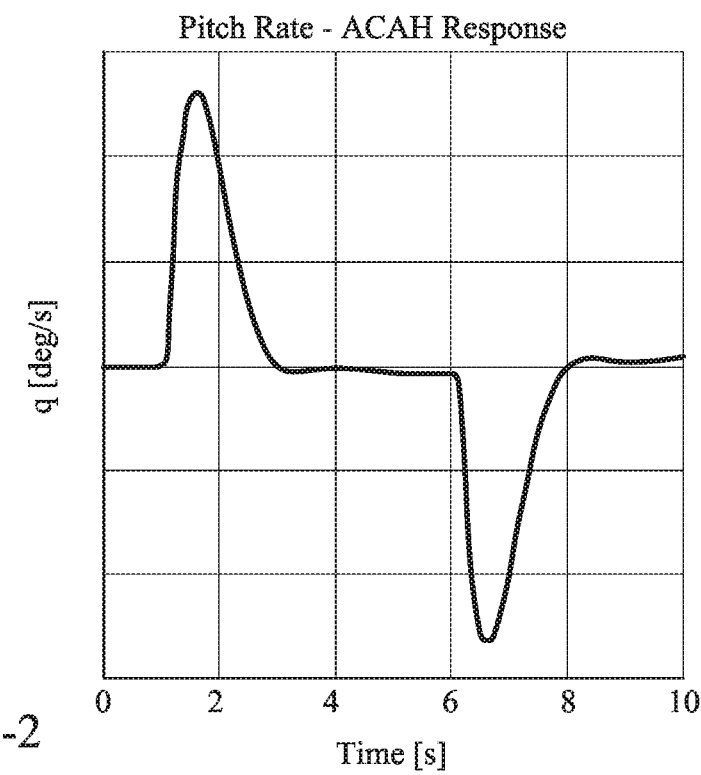
Figures 1, 3D:
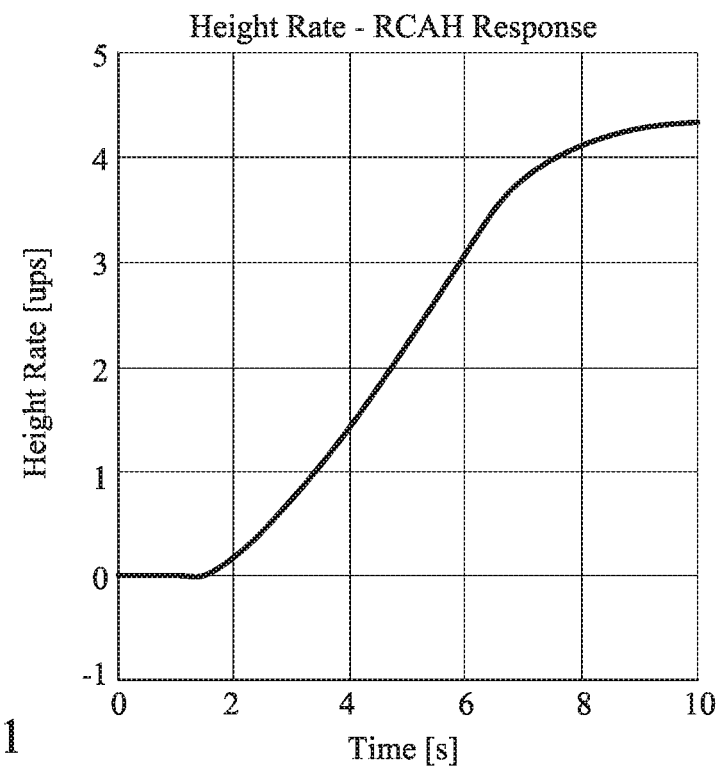
Figures 2, 3D:
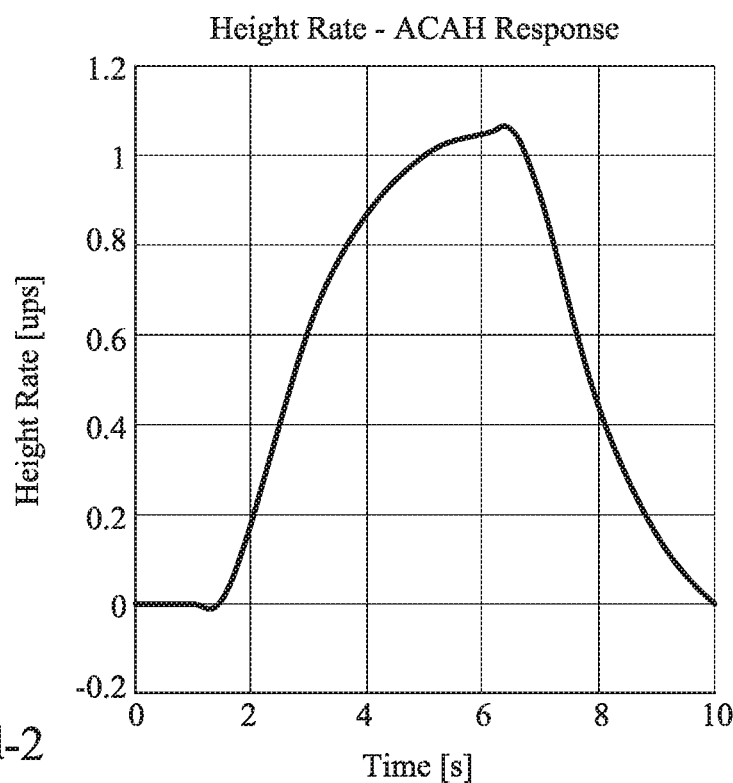
Figures 1, 3E:
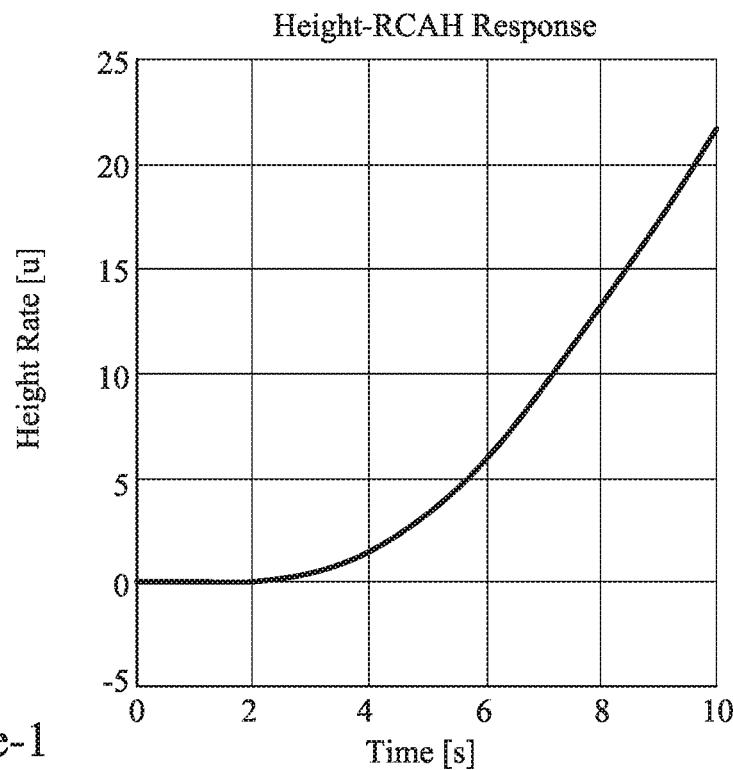
Figures 2, 3E:
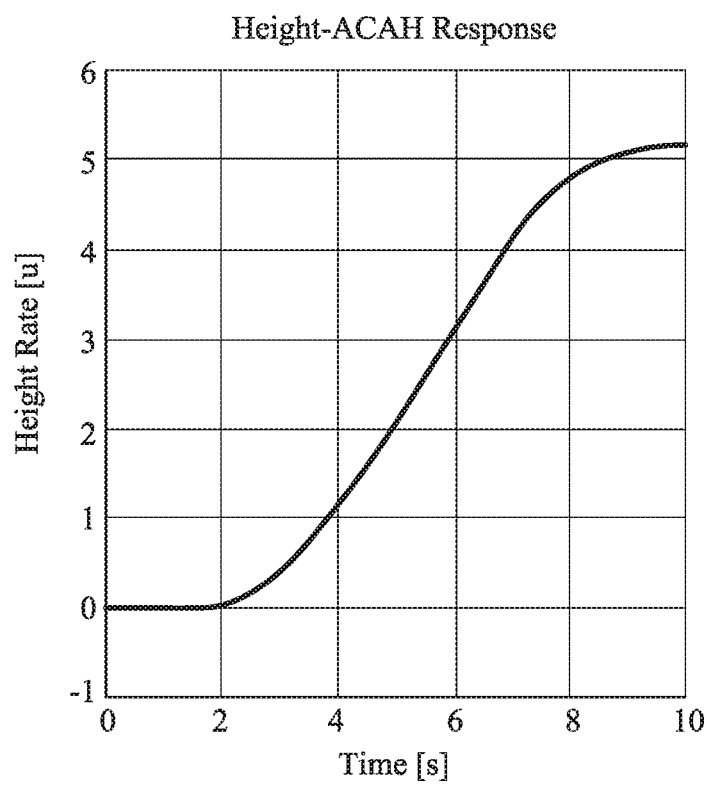
Figure 4:
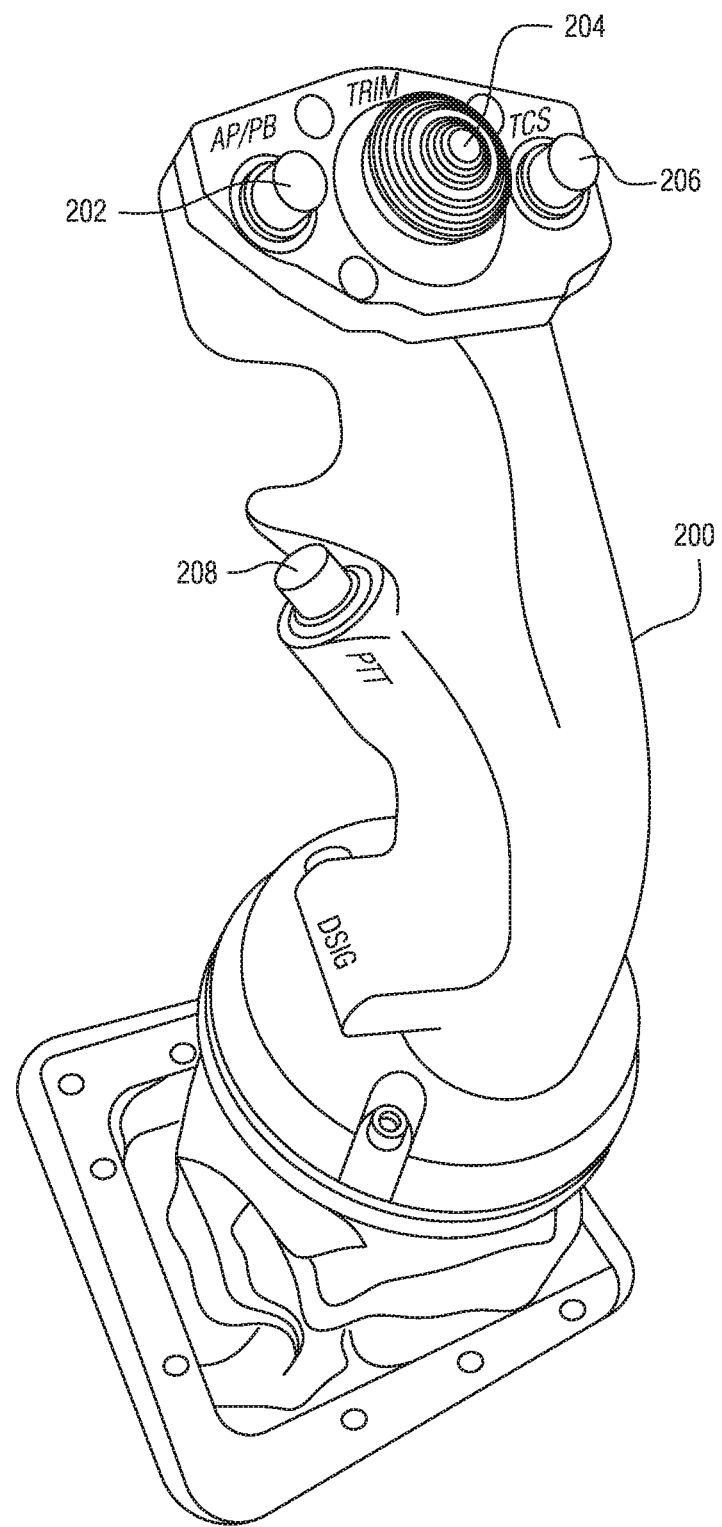

FIG. 3 illustrates the different response characteristics of a RCAH and ACAH system for a dimensionless pitch input to each system. The ACAH system relies heavily on the pilot being able to trim the aircraft to the required attitudes to maintain the Fine tracking solution. As can be seen in FIG. 3 and FIG. 3a, the inceptor in each case provides a step input. The well-known RCAH and ACAH responses are shown in FIG. 3 and FIGS. 3b-1 and 3b-2, respectively. The corresponding RCAH and ACAH pitch rates are shown in FIGS. 3 and 3c-1, 3c-2, respectively. The corresponding RCAH and ACAH height rate responses are shown in FIGS. 3 and 3d-1, 3d-2, respectively.

The corresponding RCAH and ACAH height responses are shown in FIGS. 3 and 3e-1, 3e-2, respectively. When performing fine tracking, the pilot is primarily concerned with controlling to a specific height relative to the tanker. These last two traces indicate the tendency of the ACAH system to return to the zero height rate condition. The magnitude of the step in height is directly proportional to the magnitude and length of the step input from the inceptor.

The present technology makes it easier for the pilot to trim the aircraft to the required attitudes to maintain the Fine tracking solution. Aspects of the present non-limiting technology facilitates the process of trimming the aircraft to the required reference attitudes.

Example Non-Limiting Command Shaping and Fine Tracking Quickener

Figure 5:
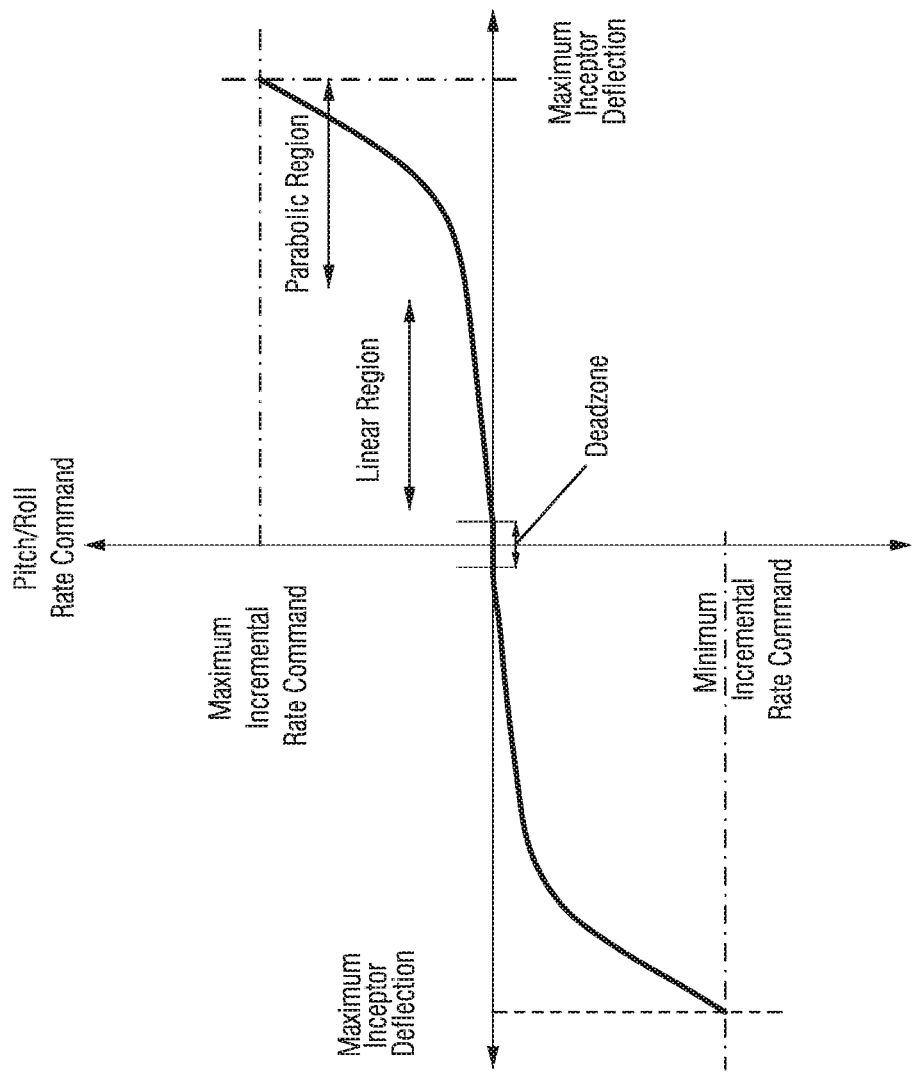
FIG. 5 shows an example non-limiting Command shaping function.
Figure 6:
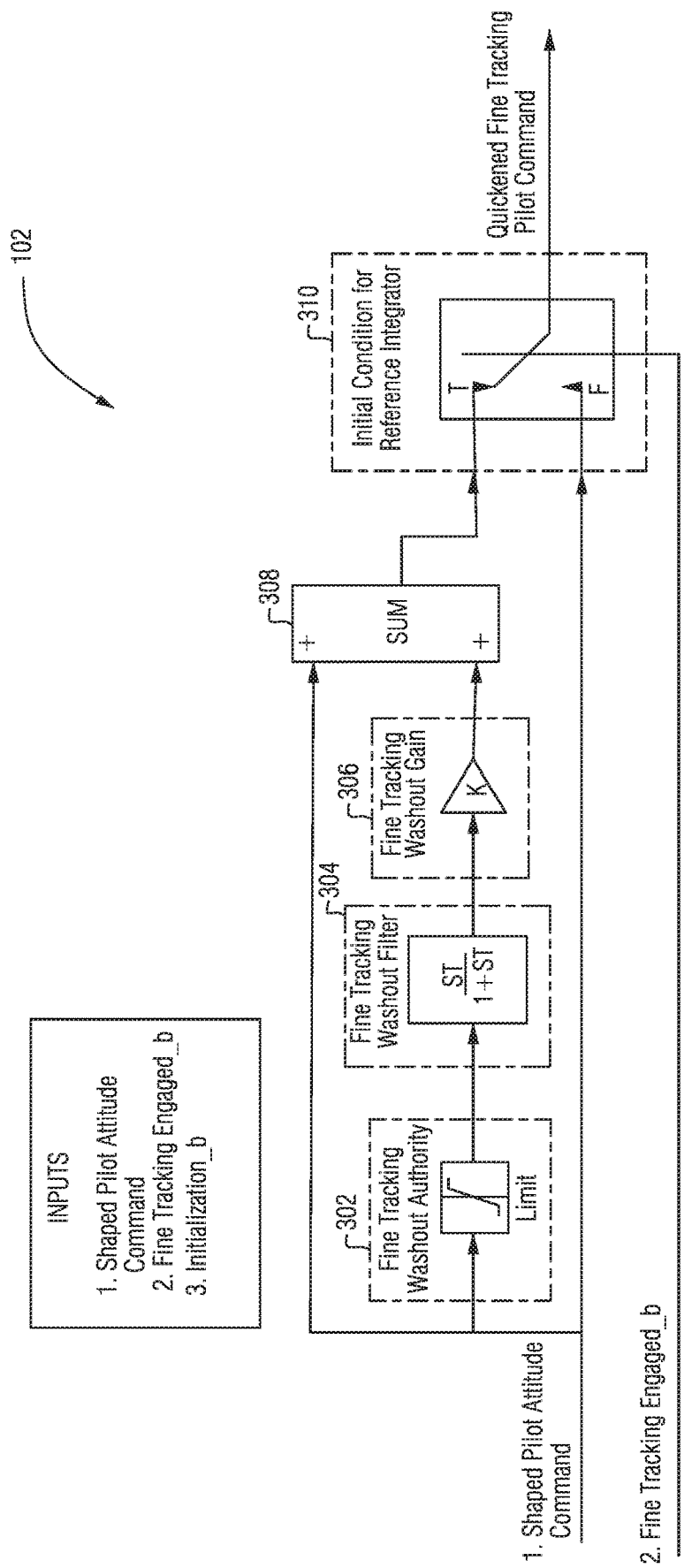
FIG. 6 shows an example non-limiting Fine Tracking Quickener providing a phase advance to the command path operating on small signals about zero command.

FIGS. 5 and 6 illustrate in more detail the functionality of the "Command Shaping and Fine tracking Quickener" block 102 discussed above in connection with FIG. 2.

In a non-limiting example, the Command Shaping function applies a variable gain depending on inceptor deflection to produce a Shaped Pilot Attitude Command. In the non-limiting example shown, the command shaping function portion of FIG. 2 block 102 makes use of the following input:

Pilot_Inceptor_u: This real signal is directly proportional to the deflection of the Pilot Inceptor in stick units.

For the purposes of fine tracking, the Command shaping has a reduced slope around the center stick position which reduces the effect of the non-linear dead zone region about center as the pilot has to move the inceptor further from the hysteresis region during the normal fine tracking task. For larger inceptor inputs, normally associated with large open loop commands, the authority of the inceptor is recovered to full authority for full deflection by the introduction of a parabolic blend from the low gain central region to the end stop. This reduces the gain discontinuity which would otherwise be noticed by the pilot when operating the inceptor about the ends of the central linear region.

FIG. 5 shows an example non-limiting Command shaping function used for the Fine Tracking control laws to provide a reduced gain over the linear region which reduces the effect of the dead zone. The full authority is recovered over the parabolic region. This figure is applicable to the shaping gain applied to both the pitch and lateral axes. This figure thus shows a mixed-mode response function with:

a small deadzone (so minute displacements of the stick do not trigger any inceptor pitch/roll rate command);

a linear region (so response to inceptor displacement that exceeds the deadzone displacement but is less than a predetermined threshold results in a linear response with pitch/roll command magnitude increasingly linearly with stick displacement);

a non-linear (e.g., parabolic) region (so response to inceptor displacement that exceeds the predetermined threshold results in non-linear, rapid increases in pitch/roll rate command magnitude for greater stick displacement);

a blended region (the transition regions between the linear regions and the non-linear regions) that is a blend of the linear and parabolic transfer functions discussed above; and a clamped region (so that maximum or "end stop" inceptor deflection in one direction results in a minimum incremental rate command, and maximum or "end stop" inceptor deflection in the other direction results in a maximum incremental rate command).

Such a function as described above can be implemented in a variety of different ways including for example a lookup function table stored in memory that a processor or other memory addressing circuit uses to map inceptor input to shaped command output.

The FIG. 2 block 102 further includes a "Fine Tracking Quickener". The Fine Tracking Quickener, depicted in more detail in FIG. 6, is a first order lead-lag filter which has a limit placed on the high frequency path. The FIG. 6 example non-limiting Fine Tracking Quickener provides a phase advance to the command path operating on small signals about zero command. The filter therefore behaves as a normal lead lag filter for small inputs, where the high frequency gain is set at a value to recover the high frequency gain lost by the shaping filter around the linear center stick region. For larger stick inputs, where the High frequency path is saturated, the ratio of HF over LF gain is effectively reduced in proportion to the degree of HF path saturation.

In more detail, the FIG. 6 example non-limiting Fine Tracking Quickener circuit receives as inputs:

The shaped pilot attitude command as described above;

A Fine Tracking Engaged_b command (e.g., a Boolean signal that asserts TRUE when the system has engaged a control law mode that requires high precision fine tracking capability); and Initialization b (a boolean signal that asserts TRUE to initialize the quickener).

The shaped pilot attitude command is provided to a fine tracking washout authority limiting function 302. The output of function 302 is provided to a fine tracking washout filter 304 of form ST/(1+ST). The output of filter 304 is provided to a fine tracking washout gain 306. This gain-adjusted output is summed (by a summer 308) with the shaped pilot attitude command. A multiplexer 310 selects (switches) between the output of summer 308 and the unquickened shaped pilot attitude command (based on the logic state of the Fine Tracking Engaged_b signal) for output as the quickened fine tracking pilot command, while also providing an initial condition for a reference integrator.

Example Non-Limiting Attitude Reference Calculation

Figure 7:
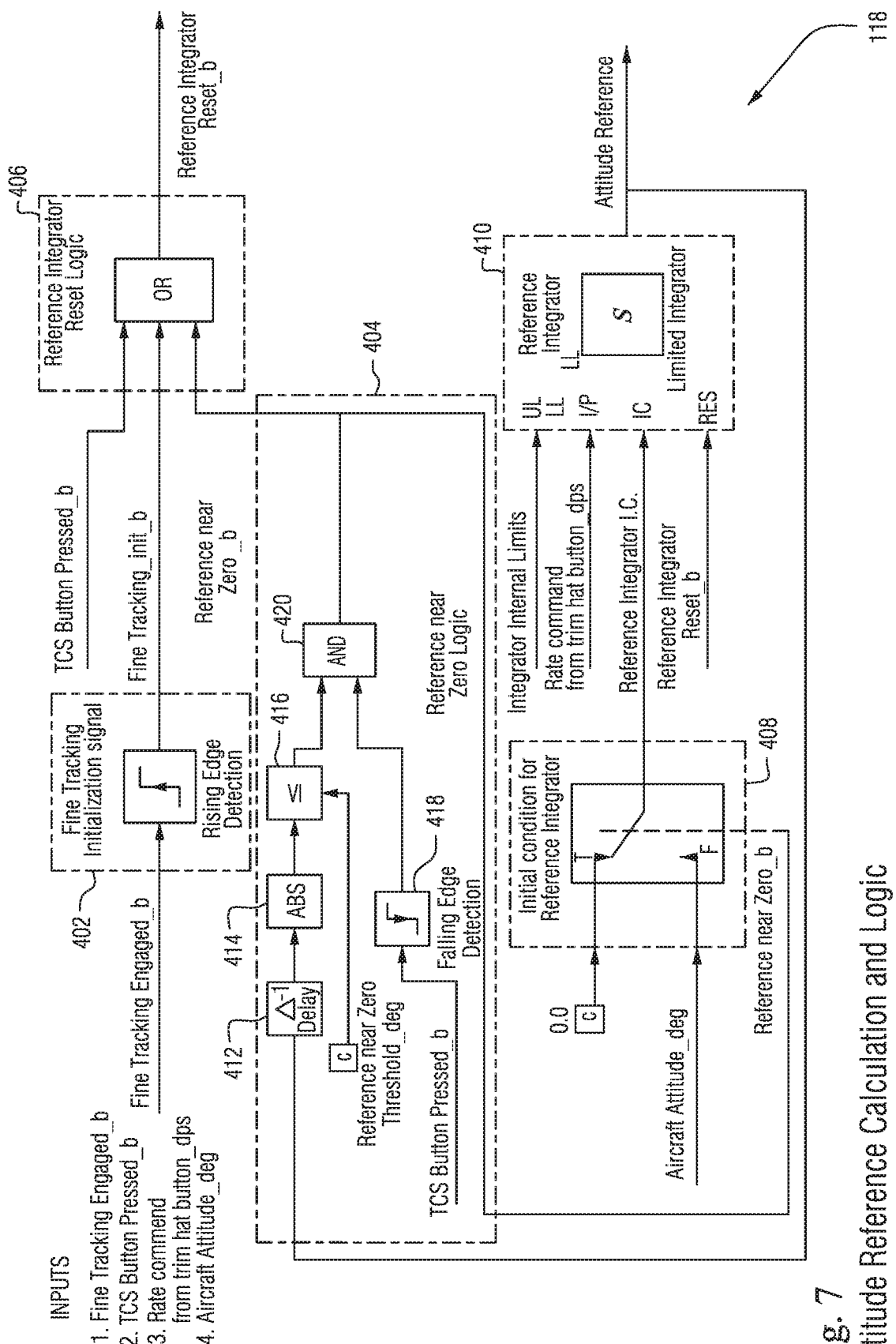
FIG. 7 shows an example non-limiting Attitude reference calculator using the functionality illustrated in FIG. 7.

FIG. 7 is an example non-limiting block diagram of the Attitude reference calculation function 118 of FIG. 2. Briefly, in the example shown, the attitude reference calculation function 118 comprises an internally limited integrator which stores the Attitude Reference and integrates the trim rate command at a predefined rate whenever the Trim hat button 204 is pressed up or down. Logic is present to rapidly initialize to the current bank (and/or pitch) angle whenever the TCS button 206 is pressed and to initialize to zero if the TCS button is released whenever the reference lies within the threshold from zero.

The non-limiting example Attitude reference calculation circuit 118 of FIG. 7 uses the following four input signals:

Fine Tracking Engaged_b: This boolean signal is TRUE when the system has engaged a control law mode that requires the high precision fine tracking capability. It is used to initialize reference integrators and activate paths containing the functionality for fine tracking purposes.

TCS Button Pressed_b: This boolean signal is TRUE when the system has acknowledged the pilot pressing the TCS button 206 on the Inceptor 200 grip. It is used to update the reference integrator, the output of which provides the attitude reference to which the system is controlling to.

Rate command from trim hat button_dps: This real signal is the reference rate controlled by the conventional trim hat button 204 on the inceptor 200 grip. The characteristics of this signal are that this signal will always be one of three values:

1. Trim rate Up (Trim hat button 204 pressed in direction to increment reference).
2. Trim rate Down (Trim hat button 204 pressed in direction to decrement reference).
3. Zero (Trim hat button 204 not pressed or failed).

Aircraft Attitude_deg: This signal is the current attitude of the aircraft (either Bank or Pitch) and is used to provide the initial condition for the reference integrator whenever the TCS button is pressed. This Aircraft Attitude_deg can be obtained from a conventional attitude sensing system including for example an inertial sensing system including gyrosensor(s), an electro-optical theodolite, a mechanical gyroscope, or any other conventional sensor that measures aircraft attitude in the requisite degree(s) of freedom (e.g., roll or lateral attitude, and pitch or longitudinal attitude).

In more detail, as shown in FIG. 7, the Fine Tracking engaged_b Boolean signal rising edge is detected by a rising edge detector 402 providing a Fine Tracking Init_b boolean signal that asserts TRUE when fine tracking is engaged. The Reference Integrator Reset Logic function 406 asserts the Reference Integrator Reset_b signal when this Fine Tracking Init_b boolean signal asserts TRUE OR the TCS button 406 is pressed OR the multiplexer 408 asserts a Reference near Zero_b boolean signal.

The reset condition for the reference integrator is thus generated whenever any of the following three conditions are satisfied:

TCS Button Pressed_b=.TRUE.

A rising edge being detected on Fine Tracking Engaged_b.

The Reference value lies within the threshold from zero when a falling edge has been detected on the TCS Button Pressed_b signal.

In some example embodiments, the last of these conditions may only be implemented if it is deemed necessary for the pilot to find an exact zero reference for the task in hand. In the example shown, the "reference near zero" logic 404 comprises a delay 412, an absolute value function 414, a threshold detector 416 (which compares the output of absolute value function 414 to a constant reference near zero threshold degrees), a falling edge detector 418 (which detects when the TCS button 206 has been released) and an AND gate 420. This circuit processes the attitude reference output of reference integrator 410 to reset the reference integrator and control multiplexer 408 to select the current Aircraft Attitude_deg signal for input as an initial condition to the reference integrator upon the TCS button 206 being released when the magnitude of the delayed output of the reference integrator 410 is less than or equal to a threshold.

The reference integrator 410 is a limited integrator that integrates the rate command from the trim hat button 408, based on integrator internal limits and initial conditions provided by multiplexer 408. The reference integrator 410 is reset by the output of the reference integrator reset logic 406 as described above. It provides an attitude reference based on the currently sensed attitude of the aircraft when the TCS button 206 is pressed and released, and then integrates based on the rate command from the trim hat button 204. As discussed above, the trim hat button 204 is controlled by the pilot to alternately provide Trim rate Up (Trim hat button 204 pressed in direction to increment reference), Trim rate Down (Trim hat button 204 pressed in direction to decrement reference), or Zero (Trim hat button 204 not pressed).

Figure 8:
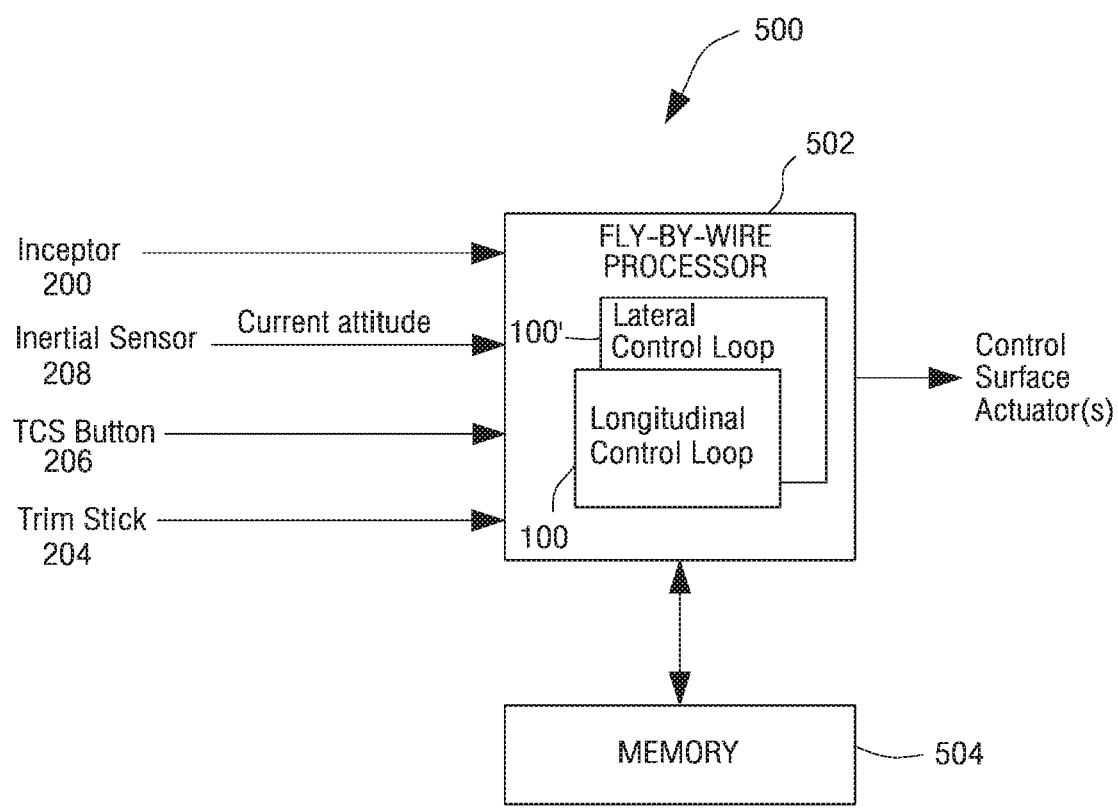
FIG. 8 shows an example overall non-limiting fly by wire control system on board an aircraft.

FIG. 8 shows an example overall system 500 including a fly-by-wire processor 502 that implements the example control functions described above and shown in FIGS. 2-7. In the example shown, the fly-by-wire processor 502 receives the inceptor 200 displacement input signal, the TCS button 206 input signal, the trim hat (up/down/neutral) 204 input signal, and current attitude from the inertial sensing/tracking system 506 of the aircraft. The fly-by-wire processor 502 executes instructions stored in non-transitory memory 504 to perform the functions described above. In one example embodiment, processor 502 implements two independent threads (100, 100') of the FIG. 2 control architecture, one for longitudinal attitude and one for lateral attitude, with the left-right displacement of inceptor 200 and trim hat 204 being used for control of the lateral attitude control function 100', and the up-down displacement of the inceptor and trim hat being used for control of the longitudinal attitude control function 100, and the activation of button 206 controlling both threads to establish respective reference attitudes in response to roll and pitch attitude measurements, respectively. The fly-by-wire processor 502 generates outputs to automatically adjust the positions of longitudinal and lateral attitude control surface actuators such as the elevator and/or horizontal stabilizer for pitch control, and the ailerons on each wing for roll (bank) control.

Other embodiments could use any of a variety of different circuits including analog circuits, discrete logic circuits, gate arrays, custom integrated circuits, lookup tables, digital signal processors, or the like to implement some or all of the closed loop control features discussed herein, as understood by those of ordinary skill in the art.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A fly by wire system for controlling an attitude of an aircraft comprising an inceptor providing an inceptor displacement signal, the inceptor including a manually depressible button that produces a button activation signal in response to manual depression thereof, the fly by wire control system comprising: a processor connected to receive the inceptor displacement signal, the button activation signal, and an aircraft attitude measurement,
the processor generating an output adapted to control attitude control surfaces of the aircraft,
wherein the processor captures the aircraft attitude measurement in response to the button activation signal, the manually depressible button being operable as an attitude hold button that controls the fly by wire control system to capture sensed attitude at the moment the button is depressed,
wherein the processor is configured to use the captured aircraft attitude measurement as a reference attitude for further manual control of the attitude of the aircraft in response to the inceptor displacement signal to update aircraft attitude datum for use when rapid accurate trim capturing is required for specific tasks.

2. The fly by wire system of claim 1 wherein the processor captures pitch and roll attitude measurements as reference lateral and longitudinal attitudes.

3. The fly by wire system of claim 1 wherein the processor is further configured to receive an input from a trim hat control input, and to integrate the captured reference attitude in response to the trim hat control input.

4. The fly by wire system of claim 1 wherein the processor is further configured to provide a fine tracking quickener.

5. A fly by wire control system comprising:
a processor connected to receive an inceptor displacement signal, a button activation signal, and an aircraft attitude measurement;
the processor generating an output adapted to control attitude control surfaces of an aircraft;
wherein the processor, in response to the button activation signal, captures the aircraft attitude measurement to use as a reference attitude for further manual control of an attitude of the aircraft in response to the inceptor displacement signal,
wherein the processor includes a command shaping circuit that has a reduced slope around a center inceptor position to reduce the effect of a non-linear deadzone region about the center inceptor position, requiring the pilot to displace the inceptor further from a hysteresis region during a fine tracking task.

6. The fly by wire system of claim 1 wherein the processor is further configured to provide a reference integrator that resets in response to the button activation signal and integrates the reference attitude based on a received rate command.

7. The fly by wire system of claim 6 wherein the processor is configured to sum the integrated reference attitude and a shaped version of the inceptor displacement signal using closed loop control.

8. The fly by wire system of claim 1 wherein the processor is configured for manual fine tracking control.

9. The fly by wire system of claim 1 wherein the processor is configured for use during an inflight probe and drogue refueling task.

10. A method of manually controlling an aircraft performing inflight refueling or other tasks requiring fine attitude tracking with another aircraft, the method comprising:
receiving a manual attitude hold command;
in response to the received manual attitude hold command, capturing aircraft lateral and longitudinal attitudes to establish reference lateral and longitudinal attitudes; and
in response to inceptor deflection indicative of turn rate and the established reference lateral and longitudinal attitudes, using closed loop control to provide manual attitude control with high gain tracking characteristics.

11. The method of claim 10 further including adjusting the reference lateral and longitudinal attitudes in response to a manual control on an inceptor.

12. The method of claim 10 wherein using closed loop control includes integrating the reference lateral and longitudinal attitudes.

13. The method of claim 10 wherein using closed loop control includes generating shaped pilot attitude commands in response to inceptor deflection indicative of rate, and generating phase advances when the shaped pilot lateral attitude commands indicate small differences with respect to a zero inceptor position.

14. An aircraft comprising:
an attitude sensor;
an inceptor having an on/off control thereon;
at least one actuator operable to change the position of an attitude control surface; and
a fly by wire processor operatively coupled to the attitude sensor, the on/off control and the at least one actuator, the fly by wire processor being configured to execute control instructions that make the on/off control operable as an attitude hold button that controls the fly by wire processor to capture sensed attitude at the moment the on/off control is activated, and to use the captured sensed attitude as a reference attitude to update aircraft attitude datum for use when rapid accurate trim capturing is required for specific tasks.

15. The aircraft of claim 14 wherein the fly by wire processor includes a command shaping and fine tracking quickener and a reference attitude calculator.

16. The aircraft of claim 15 wherein the fine tracking quickener comprises a washout authority limiter, a washout filter, a washout gain and a summer.

17. The aircraft of claim 14 wherein the fly by wire processor is further configured to permit a pilot to manually trim the reference attitude.

18. The aircraft of claim 14 wherein the processor is further configured to calculate the reference attitude by using an internally limited integrator which stores the reference attitude and integrates a trim rate command at a predefined rate for the duration of a manual control being pressed up or down.

19. The aircraft of claim 14 wherein the attitude comprises lateral and longitudinal attitudes.

20. The aircraft of claim 14 wherein the specific tasks comprise air-to-air refueling of the aircraft.

* * * * *